United States Patent Office 3,057,929
Patented Oct. 9, 1962

3,057,929
PREPARATION OF INDANOLS
Joseph T. Arrigo, Broadview, Ill., assignor to Universal Oil Products Company, Des Plaines, Ill., a corporation of Delaware
No Drawing. Filed Sept. 28, 1959, Ser. No. 842,561
12 Claims. (Cl. 260—621)

This invention relates to a method for preparing indanols and more particularly the invention relates to a novel synthesis of indanols by treating chromans.

It has now been discovered that indanols and particularly substituted indanols are effective antioxidants for organic materials which are normally subject to oxidative deterioration and also may be used as antioxonants in rubber. Furthermore the indanols may be halogenated by processes well known in the art such as chlorination using chlorine or other halogenating agents to form compounds which are effective as insecticides, germicides, or fungicides.

Therefore, it is an object of this invention to provide a novel synthesis of indanols.

A further object of this invention is to provide a method for the preparation of indanols using chromans or substituted chromans as the starting materials.

One embodiment of this invention resides in a process for the preparation of an indanol which comprises treating a chroman in the presence of a Friedel-Crafts type catalyst at a temperature in the range of from about 0° to about 100° C.

A further embodiment of this invention is found in a process for the preparation of an indanol which comprises treating a chroman in the presence of a molar excess of a Friedel-Crafts type catalyst and an inert organic solvent at a temperature in the range of from about 0° to about 100° C.

A specific embodiment of the invention resides in a process for the preparation of an indanol which comprises treating a chroman in the presence of a molar excess of aluminum chloride and an inert organic solvent at a temperature in the range of from about 0° to about 100° C.

A more specific embodiment of the invention resides in a process for the preparation of an indanol which comprises treating 2,2,3-trimethylchroman in the presence of a molar excess of aluminum chloride and n-heptane at a temperature in the range of from about 20° to about 35° C. to form the desired 1,1,2-trimethyl-4-indanol.

Other objects and embodiments referring to alternative chromans and alternative Friedel-Crafts type catalysts will be found in the following further detailed description of the invention.

As hereinbefore set forth it has now been discovered that indanols and substituted derivatives thereof may be prepared by treating a chroman or a substituted chroman in the presence of a Friedel-Crafts type catalyst to effect an ether scission and subsequent cyclization. Chromans which may undergo this rearrangement to form the corresponding indanol possess the general formula:

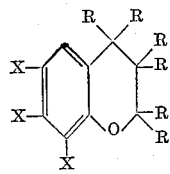

in which the X's are independently selected from the group consisting of hydrogen, aryl, alkyl, cycloalkyl, halogen or n-alkoxy groups and the R's are independently chosen from the group consisting of hydrogen, alkyl, aryl, alkaryl, and cycloalkyl radicals. Examples of chromans which fall within the general formula hereinabove set forth include chroman, 2-methylchroman, 2-ethylchroman, 2,2-dimethylchroman, 2,2-diethylchroman, 2,2-dipropylchroman, 2,2,3-trimethylchroman, 2,2,3-triethylchroman, 2,2,3-tripropylchroman, 2,2,3,3-tetramethylchroman, 2,2,3,3-tetraethylchroman, 2,2,3,3-tetrapropylchroman, 2,3,4-trimethylchroman, 2,3,4-triethylpropylchroman, 2,3,4-tripropylchroman, 2,2,3,4-tetramethylchroman, 2,2,3,4-tetraethylchroman, 2,2,3,4-tetrapropylchroman, 2,3,4,6,7,8-hexamethylchroman, 2,3,4,6,7,8-hexaethylchroman, 2,3,4,6,7,8-hexapropylchroman, 2,2,6,7,8-pentamethylchroman, 2,2,6,7,8-pentaethylchroman, 2,2,6,7,8-pentapropylchroman, 2-phenyl-2-methylchroman, 2-phenyl-2-ethylchroman, 2-phenyl-2-propylchroman, 2,2-dimethyl-3-phenylchroman, 2,2-diethyl-3-phenylchroman, 2,2-dipropyl-3-phenylchroman, 2,2-dimethyl-6-methoxychroman, 2,2-dimethyl-6,7-dimethoxychroman, 2,2-dimethyl-6-ethoxychroman, 2,2-dimethyl-6-n-propoxychroman, 2,2,3-trimethyl-6,7-dimethoxychroman, 2,2,3-trimethyl-6,7-diethoxychroman, etc. It is to be understood that the above mentioned chromans are only representatives of the class of compounds which may be used and that the present invention is not necessarily limited thereto.

The conversion of a chroman of the type hereinbefore set forth is effected by treating said chroman at temperatures ranging from about 0° or lower to about 100° C. or higher with a catalyst comprising a Friedel-Crafts metal halide type compound which possesses a substantially high activity, examples of such catalysts which may be used in this reaction including aluminum chloride, aluminum bromide, boron trifluoride, boron tribromide, zinc chloride, boron trifluoride on alumina, boron trifluoride-phosphoric acid complex, etc. Although boron is a metalloid rather than a metal it is considered to be a metal for purposes of this invention. Other catalysts which may be used include hydrogen fluoride, hydrogen bromide, hydrogen fluoride-boron trifluoride mixture, etc. The catalyst which is used in the process of this invention is present in a molar excess over the chroman which is to be converted to the corresponding indanol, said catalyst being present in a mole ratio in the range of from about 1.1 to about 2 moles of catalyst per mole of chroman. It is contemplated within the scope of this invention that the reaction may be effected in the presence of a substantially inert organic solvent, the preferred solvents having a normal paraffinic configuration such as n-pentane, n-hexane, n-heptane, etc.

The process of this invention may be effected in any suitable manner and may comprise either a batch or a continuous type operation. For example, when a batch type operation is used, a quantity of the particular chroman or substituted chroman to be converted is placed in an appropriate apparatus such as an alkylation flask which is provided with temperature control means and stirring means. The particular solvent and catalyst, in a molar excess over the chroman, are added and the reaction mixture is continuously stirred for a predetermined period of time ranging from about 0.1 to about 8 hours or more while maintaining the temperature at a predetermined level. At the end of the reaction time the aluminum chloride complex is decomposed with ice water and the organic layer is separated and extracted with dilute aqueous caustic, then the extract is acidified and extracted with ether and the ether extract and containing the phenolic products is dried and subjected to fractional distillation, the desired reaction product comprising the indanol being recovered therefrom. The caustic extraction step may be omitted in certain cases in which crystalline indanols are produced directly on decomposition of the aluminum chloride complex.

The process of the present invention may also be effected in a continuous type operation. When this method is used the chroman or substituted chroman to be converted to the corresponding indanol is continuously charged at a liquid hourly space velocity (the volume of charge per volume of catalyst per hour) in a range of from about 0.1 to about 20 or more, the preferred range being from about 0.5 to about 5, to a reaction zone which is maintained at the proper operating conditions of temperature and pressure. This reaction zone may comprise an unpacked vessel or coil or may be lined with an adsorbent packing material such as fire brick, bauxite, dehydrated alumina or the like, said reaction zone containing the particular catalyst which is to be used. The substantially inert organic solvent is also continuously charged to the reaction zone through a separate line or, if so desired, it may be admixed with the chroman before entry into said reaction zone and the mixture charged thereto in a single stream. After a predetermined residence time the reaction product is continuously withdrawn from the reaction zone, separated from the reactor effluent, purified and recovered by conventional means such as extraction, fractional distillation, crystallization, etc.

A particularly suitable type of continuous operation which may be used in the process of this invention comprises the fixed bed type in which the catalyst is disposed as a fixed bed in the reaction zone while the chroman or substituted chroman which is to be converted to the corresponding indanol passes therethrough in either an upward or downward flow. Other types of processes which may be used include the compact moving bed type in which the catalyst and the reactants pass through the reaction zone either concurrently or countercurrently to each other and the slurry type operation in which the catalyst is carried into the reaction zone as a slurry in the chroman.

Examples of indanols which may be produced according to the present process include 4-indanol, 1-methyl-4-indanol, 1-ethyl-4-indanol, 1,1-dimethyl-4-indanol, 1,1-diethyl-4-indanol, 1,1-dipropyl-4-indanol, 1,1,2-trimethyl-4-indanol, 1,1,2-triethyl-4-indanol, 1,1,2-tripropyl-4-indanol, 1,2,3-trimethyl-4-indanol, 1,2,3-triethyl-4-indanol, 1,1,2,3-tetramethyl-4-indanol, 1,1,2,3-tetraethyl-4-indanol, 1,2,3,5-tetramethyl-4-indanol, 1,1,6,7-tetramethyl-4-indanol 1,2,3,5-tetraethyl-4-indanol, 1,1,2,3,5,6,7-heptamethyl - 4 - indanol, 1,1,2-trimethyl-5-methoxy-4-indanol, 1,1,2-trimethyl-6-methoxy-4-indanol, 1,1,2-trimethyl-7-methoxy-4 - indanol, 1,1-dimethyl-5,6-dimethoxy-4-indanol, 1,1-diethyl-5-methoxy-4-indanol, 1,1-dimethyl-2-phenyl-4-indanol, 1,1-dimethyl-2,3-diphenyl-4-indanol, etc.

The following examples are given to illustrate the process of the present invention, which, however, are not intended to limit the generally broad scope of the present invention in strict accordance therewith.

*Example I*

In this experiment, to a mixture of 10.2 g. (0.058 mole) of 2,2,3-trimethylchroman and 51.3 g. of n-pentane in an alkylation flask provided with a mechanical stirrer and reflux condenser, was added 15.5 g. (0.116 mole) of aluminum chloride. The mixture was stirred for 1.1 hours at 27–31° C., at the end of which time the golden-orange complex was decomposed with cold, dilute hydrochloric acid. The mixture was extracted with ether and the ether evaporated from the extract to yield 10.0 g. of soft, pale yellow crystals. The crystals were dissolved in n-heptane and decolorization of this solution followed by concentration and cooling of the solution yielded 7.0 g. of long lustrus white needles. The mother liquor yielded an additional 0.6 g. of crystals along with some oily liquid. The crystals (total yield: 75%) were then subjected to an additional recrystallization step yielding needle-shaped crystals having a melting point of 92.5–93.5° C. The 1,1,2-trimethyl-4-indanol was subjected to analysis with the following results.

Calculated for $C_{12}H_{16}O$: C, 81.78; H, 9.14. Found: C, 81.79; H, 9.12.

The infrared spectrum of the crystalline product was in accord with the proposed structure, and the molecular weight, determined by mass spectroscopy, was found to be 176 (calculated: 176.2).

*Example II*

In this example 15.2 g. (0.094 mole) of 2,2-dimethylchroman was placed in an alkylation flask along with 13.7 g. (0.103 mole) of aluminum chloride and 50.2 g. of n-pentane. The mixture was continuously stirred for a period of about 3.5 hours, the temperature during the reaction time being in the range of from 24° to 36° C. At the end of this time the complex was decomposed with ice water and the mixture was extracted with ether. The crystals resulting therefrom were dissolved in n-heptane and recrystallized to afford a 63% yield of the indanol. The desired product, comprising small, transparent prisms of 1,1-dimethyl-4-indanol melted at 88° to 88.5° C. An analytical sample of the crystals was subjected to analysis (after vacuum sublimation) with the following results.

Calculated for $C_{11}H_{14}O$: C, 81.44; H, 8.69. Found: C, 81.44; H, 8.63.

Infrared analysis was in accord with the proposed structure, and the molecular weight as determined by mass spectroscopy was found to be 162 (calculated: 162.2).

*Example III*

In this example 9.6 g. (0.05 mole) of 2,2,7,8-tetramethylchroman are treated with 15 g. of aluminum chloride and 50 g. of n-heptane under conditions similar to that set forth in the above examples. The resulting product is extracted with ether following which the ether is evaporated. The resulting crystals are dissolved in n-heptane and recrystallized as above, the desired product, comprising 1,1,5,6-tetramethyl-4-indanol being recovered therefrom.

*Example IV*

In this example 2-phenylchroman was refluxed with aluminum chloride and n-heptane for a period of one hour at a temperature in the range of from 89° to 97° C. At the end of this time the reaction product was recovered and treated with a caustic solution. The caustic soluble fraction of the product was extracted with ether and the ether evaporated yielding a partially crystalline phenolic material plus oil.

I claim as my invention:

1. A process for the preparation of a 4-indanol which comprises treating a chroman in the presence of a molar excess of a Friedel-Crafts catalyst at a temperature in the range of from about 0° to about 100° C.

2. A process for the preparation of a 4-indanol which comprises treating a chroman in the presence of a molar excess of a Friedel-Crafts catalyst and an inert organic solvent at a temperature in the range of from about 0° to about 100° C.

3. A process for the preparation of a 4-indanol which comprises treating a chroman in the presence of a molar excess of aluminum chloride and an inert organic solvent at a temperature in the range of from about 0° to about 100° C.

4. A process for the preparation of a 4-indanol which comprises treating a chroman in the presence of a molar excess of aluminum bromide and an inert organic solvent at a temperature in the range of from about 0° to about 100° C.

5. A process for the preparation of a 4-indanol which comprises treating a chroman in the presence of a molar excess of boron trifluoride and an inert organic solvent at a temperature in the range of from about 0° to about 100° C.

6. A process for the preparation of a 4-indanol which comprises treating a chroman in the presence of a molar excess of zinc chloride and an inert organic solvent at a temperature in the range of from about 0° to about 100° C.

7. A process for the preparation of a 4-indanol which comprises treating a chroman in the presence of a molar excess of zirconium chloride and an inert organic solvent at a temperature in the range of from about 0° to about 100° C.

8. A process for the preparation of an indanol which comprises treating 2,2-dimethylchroman in the presence of a molar excess of aluminum chloride and n-pentane at a temperature in the range of from about 25° to about 50° C. to form 1,1-dimethyl-4-indanol.

9. A process for the preparation of an indanol which comprises treating 2,2,3-trimethylchroman in the presence of a molar excess of aluminum chloride and n-pentane at a temperature in the range of from about 20° to about 35° C. to form the desired 1,1,2-trimethyl-4-indanol.

10. A process for the preparation of an indanol which comprises treating 2,2,7,8-tetramethylchroman in the presence of a molar excess of aluminum chloride and n-heptane at a temperature in the range of from about 20° to about 35° C. to form the desired 1,1,5,6-tetramethyl-4-indanol.

11. A process for the preparation of an indanol which comprises treating 2,2,3,4-tetramethylchroman in the presence of a molar excess of aluminum chloride and n-heptane at a temperature in the range of from about 20° to about 35° C. to form the desired 1,1,2,3-tetramethyl-4-indanol.

12. A process for the preparation of an indanol which comprises treating 2,2,3-triethylchroman in the presence of a molar excess of aluminum chloride and n-heptane at a temperature in the range of from about 20° to about 35° C. to form the desired 1,1,2-triethyl-4-indanol.

References Cited in the file of this patent

Loudon et al.: Chem. Soc. Jour. (1954), 4299–4303 (5 pages). (Patent Office Library.)